United States Patent Office 2,820,024
Patented Jan. 14, 1958

2,820,024
PREPARATION OF LINEAR POLY-UREAS

Gerrit Johann Meine van der Kerk, Utrecht, Netherlands, assignor to Nederlandse Organisatie voor Toegepast-Natuurwetenschappelijk Onderzoek ten behoeve van Nijverheid, Handel en Verkeer, The Hague, Netherlands, a corporation of the Netherlands No Drawing. Application March 31, 1954
Serial No. 420,197

Claims priority, application Netherlands March 12, 1949

8 Claims. (Cl. 260—77.5)

This invention relates to linear poly-ureas and more particularly to an improved method of preparing such poly-ureas.

Macromolecular compounds of this type can be made by the reaction between aliphatic primary diamines and aliphatic di-isocyanates, but it has been found that the very reactive di-isocyanates react further with the NH-groups of the urea derivatives formed, by which highly branched macromolecules are obtained. (O. Bayer, Angewandte Chemi 59 A (1947), page 257, et seq.) Consequently the products thus obtained are not suitable for the manufacture of fibres, threads and the like.

Other attempts were made for the preparation of these macromolecular compounds, such as by the action of various derivatives and substitution products of carbonic acid ($H_2CO_3$), e. g. phosgene, $CO_2$, carbonic acid esters etc. on diamines. However, with these attempts compounds which are suitable for the production of strong and durable filaments, films, foils, tubes, profiled or un-profiled bars and such like articles could not be obtained.

Poly-ureas have also been described for example by Martin in the U. S. Patent 2,181,663 according to which a di-urethane and a diamine are reacted under condensation polymerizing conditions. Such polymers are also described in the British patent literature as being produced by a process in which an aliphatic diamine is reacted with an anhydride of a thiocarbonic acid, and when this anhydride is carbonoxysulphide, the resulting product is disclosed as being heated for three hours at the boiling point of the commercial xylenol reaction medium while passing a current of nitrogen over the reacting mass. When water is used as a reaction medium, the heating is carried out preferably under elevated pressure, according to the description. However, the products thus obtained have been found to possess poor fiber-forming properties.

It is also known to prepare linear poly-ureas by reacting diamines with derivatives of dithiocarbonic acid such as dithiocarbamic esters, thiophosgene, carbondisulphide, thiocarbamic acid etc. The polythioureas thus obtained possess fiber-forming properties but owing to their sulphur content, they show several disadvantageous properties such as their easy oxidizability when exposed to air.

Whereas the foregoing procedures produce products which are said to be linear polyurea compounds, it has now been determined that the reaction masses obtained by the foregoing procedures contain substantial amounts of impurities therein arising from side reactions due to to the presence and activity of the decomposition products of the monothiocarbamate which are being formed during the polymerization step in which high temperatures must be employed. The presence of these impurities interferes with the uniform polymerization accomplished according to my invention and contaminates the polymerization mass in such manner as to lessen the stability or strength of fibers or other products produced therefrom.

An object of my invention is to prepare linear poly-ureas with greatly improved properties. A second object is to provide a method for the preparation of such poly-ureas which are of linear structure and excellently suited for the manufacture of filaments, rods, tubes, foils, coatings, and the like by melt-spinning, extruding, injection molding, flame spraying, etc. Other objects will appear hereinafter.

As an initial step, salt-like monothiocarbamate compounds are prepared by reacting carbon oxysulfide with a diamine of the general formula $H_2N-R-NH_2$ in which R represents a linear radical or chain containing at least four carbon atoms. This monothiocarbamate compound contains equimolecular amounts of thiocarbamic acid and amine groups and may be represented schematically by the molecular formula:

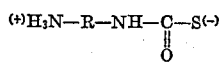

which molecules have been described as being bound to one another in a salt-like way (compare for example the salt-like bond of the hydrochloric salt of aniline).

In the polymerization reaction of the invention, the salt-like monothiocarbamate compound is converted into a sulphur-free polymeric urea compound by heating under a vacuum at least of a magnitude that the volatile products, such as COS and the diamine formed during the heating are removed before these volatile products can react and inhibit the desired uniform polymerization. In this way products are obtained which have improved and superior properties as disclosed hereinafter.

The final products obtained from aliphatic diamines containing 6 or more carbon atoms have melting points of 300° C. or lower and are consequently preferred.

It is advantageous to utilize various mixtures of diamines, since with such mixtures the melting point of the final product can be lowered substantially while retaining desirable, useful properties. For example, the addition of an alkenyl diamine of eight or more carbon atoms to hexamethylene diamine will lead ultimately to polymerized products having melting points lower than 300° C., the number of degrees lower depending on the amount of and particular alkenyl diamine used. Similar combinations of good properties can be obtained if one starts with diamines containing oxygen as a hetero-atom in the carbon chain. In these embodiments, other physical and mechanical properties of the final products may be modified at will. It is also possible to mix the separately formed salt-like monothiocarbamate compounds before their subsequent conversion and products of improved properties are likewise obtained.

Monothiocarbamate compounds obtained from diamines of the general formula $H_2N-R-NH_2$ in which R is an aliphatic, non-functional, divalent group with less than four atoms, have a great tendency to form cyclic low molecular condensation products when heated, whereas monothiocarbamate compounds obtained from such diamines in which R is a linear radical with four, but preferably more chain atoms, have an increasing tendency to form linear polymeric condensation products. For example, by introducing COS into a hexamethylenediamine solution in chloroform, a precipitate, is formed of the salt-like monothiocarbamate compound which can be converted by heating in vacuo, as herein described, into linear, macromolecular, polyhexylurea indicated by the formula:

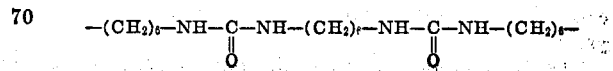

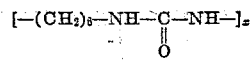

in which $x$ is an integer depending upon the degree of polymerization.

The reaction between the diamine and COS is preferably carried out in an organic liquid at room temperature. It is most advantageous to use diluents in which the monothiocarbamate compound formed is insoluble, such as ethyl alcohol, benzene, xylene, toluene, and chloroform. In this process of reacting a diamine with COS, the quantities of the COS and diamine used need not be exactly adjusted to each other since, even when an excess of COS is used, only 50% of the amino-groups originally present is converted into thiocarbamic acid groups, for the amino-groups do not react further with the excess of COS. The salt-like monothiocarbamate compounds formed are easily obtained in a pure state and are stable for rather a long time when stored at room temperature.

As examples of diamines which can be used according to the invention, there can be mentioned: 1.6-diaminohexane, 1.7-diaminoheptane, 1.8-diaminooctane, 1.9-diaminononane, 1.10-diaminodecane, 1.11-diaminoundecane, 1.12-diaminododecane, etc., β-β'-diaminodiethylether, diaminopropylether, 1.8-diamino 3.6-dioxa-octane, and the like.

According to the invention, the salt-like monothiocarbamate compound obtained by reacting COS with a diamine as described above is converted into a sulphur-free compound, consisting substantially only of polymeric urea-derivatives by heating in vacuo. During this heating process $H_2S$ is drawn out of the reacting mass. This heating in vacuo, suitably at absolute pressures of about 3 cm. of mercury, preferably less, is carried out according to my invention at a temperature between about 100° C. and about 230° C. depending on the diamine used as starting material, for 6 to 16 hours or more. The reaction may also be started at a lower temperature and gradually raised. The heating must not be carried out in the presence of extraneous reaction products which are not indifferent to the reactive groups, for unwanted secondary reactions will take place impairing the properties of the final products.

When the monothiocarbamate compound is heated under normal procedures to an elevated temperature above about 150° C. under atmospheric or superatmospheric pressure, a final product is obtained with very poor properties due to side reactions which give rise to impurities, such final products moreover having as a rule a dark color and being unstable, especially thermally. The fibers spun from such poor final products can, it is true, usually be cold-stretched to a certain degree but the fibers obtained are stiff and rather brittle and lack great flexibility, suppleness and sufficient strength. If, however, the heating of the thiocarbamate compound is carried out according to the present invention in vacuo as stated above, a completely white, stable product is obtained with excellent fiber-forming properties even if the final heating has been carried out for a long period at high temperatures, as at 200° C. or more. Fibers obtained from such a final product can, with excellent results, be cold-stretched and they are very strong and flexible after having been cold-stretched.

Fibers obtained from polyureas obtained according to my invention have a tensile strength of 4–6 grams/denier at an ultimate elongation of about 15–30%, whereas fibers obtained from products prepared according to the more closely related hereinbefore described prior processes show a tensile strength of not more than 1–1½ grams/denier.

The melting points and stretchability of products and fibers according to my invention from typical aliphatic diamines are indicated in the following table:

TABLE

| Poly-urea from— | Melting point of polymer, ° C. | Stretchability |
| --- | --- | --- |
| Hexamethylene-diamine | 300 | Poor in cold condition; good at about 80° C. |
| Octamethylene-diamine | 260 | Moderate in cold condition; good at about 80° C. |
| Nonamethylene-diamine | 215 | Good in the cold. |
| Decamethylene-diamine | 230 | Do. |
| Dodecamethylene-diamine | 205 | Do. |
| Hexamethylene-diamine+decamethylene-diamine 1 mol: 1 mol mixture. | 210 | Moderate, at lower as well as at higher temperatures. |

The following examples are illustrative of the method used in carrying out my invention.

*Example 1*

COS was introduced into a solution of 172 grams of decamethylene-diamine in 2 liters of ethylalcohol until it was no longer absorbed by the solution. Immediately a white crystalline precipitate consisting of the corresponding monothiocarbamate compound was formed. The quantity of this precipitate did not further increase after the absorption of the theoretically required amount of COS. During the introduction of COS cooling was necessary because of the heat developed during the reaction. After the reaction mixture had been kept at room temperature for 3 hours, the separated product was filtered and vacuum dried over concentrated $H_2SO_4$. The yield was quantitative; the product had an apparent melting point of 230° C. The determination of this melting point had to be carried out quickly in a preheated bath, since $H_2S$ evolves far below the melting point.

The monothiocarbamate compound was next heated gradually to about 150° C. in vacuo of an absolute pressure of 4 mm. Hg and maintained for 18 hours at a temperature between 150° and 200° C. The final product thus obtained was insoluble in water and had a melting point of 220° C. From the melt, filaments could be spun the strength of which could be increased considerably by cold-stretching.

The poly-urea in powder form prepared according to this Example 1 was flame-sprayed on steel plate of which the surface had been prepared in a usual way. This procedure resulted in a coating with a very good adherence to the steel surface and which showed a good elasticity and chemical resistance.

*Example 2*

COS was passed through a solution of decamethylene-diamine in toluene, the reaction mass being worked up as indicated in Example 1. The powdery final product had a melting point of 230° C. and had very good fiber-forming properties; the threads formed from this final product could be cold-stretched with excellent results. The molecular weight of this product was very high.

Pellets were pressed from this powder and fibers were drawn from these pellets at a temperature of 270° C. by means of a spinning machine. The yield of the spinning pump amounted to 3.5 cc./minute; the spinning plate was provided with six apertures having a diameter of 400μ each and the molten product was passed through a filter, said filter being fitted into the spinning machine. The winding velocity amounted to 240 m./minute; after stretching 1:5, a fiber of approximately 30 denier was obtained.

In a dry state the strength of this fiber amounted to more than 4 g./denier, the elongation being about 20%.

Example 3

COS was introduced into a solution of equimolecular quantities of hexamethylene diamine and decamethylene diamine in chloroform until no further COS was absorbed. The reaction mass was worked up as indicated in Example 1. The precipitated mixed monothiocarbamate compound showed a melting point of 210° C. After heating in vacuo according to Example 1, a powdery and water-insoluble product was obtained having a melting point of about 210° C. The final product could suitably be drawn into threads or filaments as described in Example 2.

Example 4

COS was introduced into a solution of nonamethylene diamine in toluene. The dried precipitated product had a melting point of about 200° C. After heating in vacuo according to Example 1, the temperature being however about 200–220° C. and the absolute pressure being 3 mm. Hg, a colorless final product was obtained having a melting point of about 215° C. which final product in a molten state could be drawn into threads or filaments as indicated in Example 2.

Example 5

COS was introduced into a solution of dodecamethylene diamine in benzene. The precipitated product had a melting point of about 200° C. After heating according to Example 1, however at an absolute pressure of 2 mm. Hg a final product was obtained having a melting point of 205° C. which final product could be drawn into threads or filaments as indicated in Example 2.

Example 6

COS was introduced into a solution of β-β' diaminodiethylether in chloroform. After heating at an absolute pressure of about 5 mm. Hg for 15 hours at a temperature of 150–200° C. a homogeneous melt was obtained from which threads could be drawn. These threads could be cold stretched yielding fibers of considerable strength. The melting point of the final polymer was 160° C.

Example 7

COS was introduced into a chloroform solution of 2 mols of hexamethylene diamine and of 1 mol of decamethylene diamine until no further COS was absorbed. The reaction mass was worked up as indicated in Example 1. The precipitated mixed monothiocarbamate compound showed a melting point of 220° C. After heating in vacuo according to Example 1, a powdery, water-insoluble product was obtained having a melting point of about 225° C. The final product could suitably be drawn into threads or filaments as in Example 2.

This is a continuation-in-part of application Serial No. 148,508, filed March 8, 1950, now abandoned.

It should be understood that the present invention is not limited to the specific details herein given but that it extends to all equivalents which will occur to those skilled in the art upon consideration of the scope of the claims appended hereto.

I claim:

1. A process for the preparation of a synthetic resin mass comprising reacting a diamine volatilizable under the vacuum and temperature conditions hereinafter specified, having the general formula H₂N—R—NH₂, wherein R is an aliphatic, non-functional, divalent group having at least four carbon atoms in the chain, with carbonoxysulfide and subsequently transforming the monothiocarbamate compound formed containing equimolecular amounts of thiocarbamic acid and amine groups and possessing the schematic molecular formula

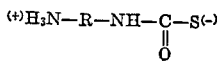

into a linear polyurea derivative by heating the said monothiocarbamate compound to a temperature from about 100° C. to a final temperature of 150° to 230° C. under an absolute pressure of not more than 3 cm. of mercury and during and by means of said heating under vacuum, removing diamines and other volatile reaction products formed before these volatile products react further and inhibit the subsequent uniform polymerization, and continuing the heating until resin polymers having fiber-forming properties are obtained.

2. The process defined in claim 1, wherein R is an aliphatic divalent hydrocarbon chain of at least four carbon atoms.

3. The process defined in claim 1, wherein the polymerization product finally obtained is spun into filaments and stretched to elongate the same by about 15 to 30%, thereby producing strong and flexible fibers.

4. The process defined in claim 1 wherein R is an aliphatic divalent hydrocarbon chain of 9 to 12 carbon atoms and wherein the final polymerization product obtained is spun into fibers and cold stretched, and strong, flexible fibers are produced.

5. The process defined in claim 1 wherein the polymerization of the monothiocarbamate compound is carried out at a temperature within the range of 100° to 230° C. for a period of at least six hours until the polymerization product is obtained.

6. A process for the preparation of a synthetic resin mass comprising reacting a diamine volatilizable under the vacuum and temperature conditions hereinafter specified, having the general formula H₂N—R—NH₂, wherein R is an aliphatic, non-functional, divalent group having a chain containing at least four carbon atoms and at least one oxygen atom, with carbonoxysulfide and subsequently transforming the monothiocarbamate compound formed containing equimolecular amounts of thiocarbamic acid and amine groups and possessing the schematic molecular formula

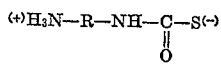

into a linear polyurea derivative by heating the said monothiocarbamate compound under an absolute pressure of not more than 3 cm. of mercury and at a temperature of from about 100° C. to a final temperature of 150°–230° C., such that diamines and other volatile products formed during the said heating are removed therefrom before these volatile products react further and inhibit the subsequent uniform polymerization and continuing the heating until resin polymers having fiber-forming properties are obtained.

7. A process for the preparation of polymerized monothiocarbamate compounds suitable for fiber formation, producible from hexamethylene diamine and COS, having melting points below 300° C. which comprises, adding a diamine volatilizable under the vacuum and temperature conditions hereinafter specified, having the general formula H₂N—R—NH₂, wherein R is an aliphatic, non-functional, divalent group having at least eight carbon atoms in the chain to hexamethylene diamine and reacting the mixture with carbon oxysulfide, and subsequently transforming the obtained monothiocarbamate compounds containing equi-molecular amounts of thiocarbamic acid and amine groups and possessing the schematic molecular formula

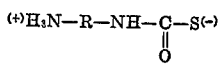

wherein R in some instances is the hexamethylene radical and in other instances the herein described divalent group of at least eight carbon atoms, into linear polyurea derivatives having melting points below 300° C. by heating the said monothiocarbamate compounds to a temperature from about 100° C. to a final temperature of 150° to 230°

C. under an absolute pressure of not more than 3 cm. of mercury and during and by means of said heating under vacuum, removing diamines and other volatile reaction products formed before these volatile products react further and inhibit the subsequent uniform polymerization, and continuing the heating until resin polymers having fiber-forming properties are obtained.

8. The process as defined in claim 7 wherein the hexamethylene diamine is supplemented by an addition of decamethylene diamine.

References Cited in the file of this patent

UNITED STATES PATENTS

| | | | |
|---|---|---|---|
| 2,181,663 | Martin | Nov. 28, | 1939 |
| 2,392,132 | Dreyfus | Jan. 1, | 1946 |

FOREIGN PATENTS

| | | | |
|---|---|---|---|
| 524,795 | Great Britain | Aug. 14, | 1940 |
| 494,500 | Belgium | Mar. 31, | 1950 |